United States Patent
Hanselmann et al.

(10) Patent No.: US 6,891,049 B2
(45) Date of Patent: May 10, 2005

(54) METHOD FOR PRODUCING N-ALKOXY-N-ALKYLAMIDES

(75) Inventors: Paul Hanselmann, Brig-Glis (CH); Stefan Hildbrand, Riehen (CH); Etienne Sterren, Glis (CH)

(73) Assignee: Lonza AG, Basel (CH)

( * ) Notice: Subject to any disclaimer, the term of this patent is extended or adjusted under 35 U.S.C. 154(b) by 343 days.

(21) Appl. No.: 10/181,420

(22) PCT Filed: Jan. 24, 2001

(86) PCT No.: PCT/EP01/00753

§ 371 (c)(1),
(2), (4) Date: Jul. 24, 2002

(87) PCT Pub. No.: WO01/55096

PCT Pub. Date: Aug. 2, 2001

(65) Prior Publication Data

US 2004/0030142 A1 Feb. 12, 2004

(30) Foreign Application Priority Data

Jan. 25, 2000 (EP) .............................. 0010139

(51) Int. Cl.⁷ ................... C07D 307/34; C07C 233/65; C07C 233/04

(52) U.S. Cl. .................. 549/487; 564/139; 564/182; 564/186; 564/204

(58) Field of Search ............... 549/487; 564/182, 564/186, 139, 204

(56) References Cited

FOREIGN PATENT DOCUMENTS

GB         852176       10/1960
WO       WO 00/32564 A    6/2000

OTHER PUBLICATIONS

Williams et al, Tetrahedron Letters, vol. 36, No. 31, pp 5461–5464, 1995.*
Shimizu et al, Tetrahedron Letters, vol. 38, No. 15, pp 2685–2688, 1997.*

M. Mentzel et al., J. prakl. Chem, (1997), 339, 517–524.

M.P. Sibi, Org. Preparations and Procedures Int., (1993), 25(1), 15–40.

International Search Report from applicants' corresponding PCT application, 2000.

J. Michael Williams et al., Tetrahedron Letters, vol. 36, No. 31, (Jul. 31, 1995), pp. 5461–5464.

Takeshi Shimizu et al., Tetrahedron Letters, vol. 38, No. 15, (1997), pp. 2685–2688.

* cited by examiner

*Primary Examiner*—Shailendra Kumar
(74) *Attorney, Agent, or Firm*—Fisher, Christen & Sabol

(57) ABSTRACT

The method for producing N-alkoxy-N-alkylamides of general formula (I):

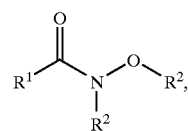

wherein $R^1$ represents $C_{1-10}$-alkyl, cyclo-$C_{5-7}$-alkyl, cyclo-$C_{5-7}$-alkenyl, $C_{2-10}$-alkenyl, aryl, aryl-$C_{1-3}$-alkyl, heteroaryl, heteroaryl-$C_{1-3}$-alkyl or heterocyclyl; and $R_2$ represents $C_{1-6}$ alkyl. In the process, an ester of general formula (II): $R^1COOR^3$, wherein $R^1$ has the above-mentioned meaning, and $R^3$ represents $C_{1-6}$-alkyl, 4-nitrophenyl, 2,4-dinitrophenyl, succinimido or benzotriazole-1-yl, is reacted with hydroxylamine, a hydroxylamine derivative or with a hydroxylammonium salt, and the reaction product is alkylated in the presence of a phase transfer catalyst.

14 Claims, No Drawings

METHOD FOR PRODUCING N-ALKOXY-N-ALKYLAMIDES

This application is a 371 of PCT/EP01/00753, filed Jan. 24, 2001

The invention relates to a process for the preparation of N-alkoxy-N-alkylamides.

Among N-alkoxy-N-alkylamides, N-methoxy-N-methyl-amides ("Weinreb amides") have by far the greatest importance. The chemistry of the Weinreb amides has been summarized in several review articles; for instance by M. Mentzel, H. M. R. Hoffmann, J. prakt. Chem. 1997, 339, 517–524 or by M. P. Sibi, Org. Preparations and Procedures Int. 1993, 25(1), 15–40.

The known processes for the preparation of N-methoxy-N-methylamides have the disadvantage that N,O-dimethylhydroxylamine is employed virtually without exception as a reagent. Since this reagent is comparatively expensive, industrial application of Weinreb amides is limited.

The object of the present invention is therefore to make available an alternative and more inexpensive process for the preparation of N-alkoxy-N-alkylamides and in particular of N-methoxy-N-methylamides.

According to the invention, this object is achieved by the process according to claim 1.

It has now been found that N-alkoxy-N-alkylamides of the general formula I

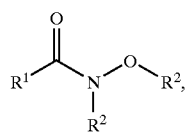

in which $R^1$ is $C_{1-10}$-alkyl, cyclo-$C_{5-7}$-alkyl, cyclo-$C_{5-7}$-alkenyl, $C_{2-10}$-alkenyl, aryl, aryl-$C_{1-3}$-alkyl, heteroaryl, heteroaryl-$C_{1-3}$-alkyl or heterocyclyl; and $R^2$ is $C_{1-6}$-alkyl; can be prepared by a process in which an ester of the general formula

in which $R^1$ has the meaning indicated above and $R^3$ is $C_{1-6}$-alkyl, 4-nitrophenyl, 2,4-dinitrophenyl, succinimido (2,5-dioxopyrrolidin-1-yl) or benzotriazol-1-yl, is reacted with hydroxylamine, a hydroxylamine derivative or a hydroxylammonium salt and the reaction product is alkylated in the presence of a phase-transfer catalyst.

$C_{1-10}$-Alkyl is understood here below as meaning all linear or branched alkyl groups having 1–10 carbon atoms such as, for example, methyl, ethyl, propyl, isopropyl, butyl, isobutyl, sec-butyl, tert-butyl, pentyl, isopentyl, tert-pentyl, neopentyl, hexyl, isohexyl, octyl, nonyl or decyl.

Cyclo-$C_{5-7}$-alkyl is understood as meaning cyclic hydrocarbon radicals having 5–7 carbon atoms such as, for example, cyclopentyl, cyclohexyl or cycloheptyl.

Cyclo-$C_{5-7}$-alkenyl is understood as meaning cyclic hydrocarbon radicals having 5–7 carbon atoms, the ring carrying a double bond, such as, for example, cyclopentenyl or cyclohexenyl.

$C_{2-10}$-Alkenyl is understood as meaning linear or branched alkylene groups having 2–10 carbon atoms, such as, for example, vinyl, allyl, methallyl, the radicals butenyl, pentenyl, hexenyl, heptenyl, octenyl and their isomers, 2-methyl-1-propenyl, 2-methyl-1-butenyl, 1-methyl-2-butenyl, 2-methyl-2-butenyl, 3-methyl-2-butenyl, 2,3-dimethyl-2-butenyl, 1,3-dimethyl-2-butenyl, 1-ethyl-2-butenyl, 4-methyl-2-pentenyl, 2-ethyl-2-pentenyl, 4,4-dimethyl-2-pentenyl or 1,4-dimethyl-1-hexenyl.

Aryl is understood as meaning aromatic hydrocarbon radicals such as, for example, phenyl, 1-naphthyl, 2-naphthyl, 1-anthryl, 2-anthryl, 9-anthryl or biphenylyl, preferably phenyl. The aryl groups can also carry one or more identical or different substituents such as $C_{1-6}$-alkyl, $C_{1-6}$-alkoxy or halogen in the ortho, meta or para position. Suitable substituted aryl radicals are, for example, methylphenyl, dimethylphenyl, ethylphenyl, propylphenyl, methoxyphenyl, ethoxyphenyl, propoxyphenyl, methylnaphthyl or methoxynaphthyl.

Aryl-$C_{1-3}$-alkyl is understood as meaning, for example, radicals such as benzyl, phenylethyl, 3-phenylpropyl, 1-naphthylmethyl or 2-naphthylmethyl. Benzyl is preferred. As mentioned above, the aryl groups can also carry one or more identical or different substituents in the ortho, meta or para position. Suitable substituted aryl-$C_{1-3}$-alkyl radicals are, for example, methylbenzyl, methoxybenzyl, methylphenylethyl or methylnaphthylmethyl.

Heteroaryl is understood as meaning radicals such as, for example, pyridyl, pyrazinyl, pyrimidinyl, pyridazinyl, quinolinyl, isoquinolinyl, pyrrolyl, pyrazolyl, imidazolyl, benzimidazolyl, thiazolyl, oxazolyl, thiophenyl, benzothiophenyl, furanyl, benzofuranyl or indolyl.

The abovementioned heteroaryl radicals can also be substituted by methyl, ethyl or propyl radicals and by methoxy, ethoxy or propoxy radicals.

Heteroaryl-$C_{1-3}$-alkyl is understood as meaning methyl, ethyl or propyl radicals which are substituted by the abovementioned heteroaryl radicals, such as pyridylmethyl, pyrazinylethyl, pyrimidylpropyl and the like.

Heterocyclyl is understood as meaning nonaromatic heterocyclic radicals such as, for example, morpholinyl, tetrahydrofuranyl, dihydrofuranyl, tetrahydrothiophenyl, dihydrothiophenyl, pyrrolidinyl, imidazolinyl, pyrazolinyl, piperidinyl, piperazinyl and the like.

Suitable phase-transfer catalysts include quaternary ammonium or phosphonium salts or tertiary amines. Quaternary ammonium salts are preferred, such as tetra-n-$C_{1-10}$-alkylammonium, benzyltri-n-$C_{1-10}$-alkylammonium and methyltri-n-$C_{4-10}$-alkylammonium halides. Halide is preferably chloride or bromide and the alkyl groups, if there is more than one, may have the same or different chain lengths. Tetrabutylammonium bromide is particularly preferred.

The phase-transfer catalysts mentioned are commercially obtainable or may be prepared according to known methods.

Hydroxylamine derivatives are understood as meaning compounds of the formula $NH_2$—$OR^4$ where $R^a$ is $C_{1-3}$-alkyl, for example O-methylhydroxylamine.

Examples of hydroxylammonium salts are hydroxylammonium sulfate and hydroxylammonium chloride. Both products are commercially obtainable.

Alkylating agents which may be employed according to the invention are $C_{1-6}$-alkyl halides, preferably alkyl chlorides or alkyl bromides. Methyl chloride is particularly preferred.

The esters of the formula $R^1COOR^3$ are commercially obtainable or can be prepared by known esterification processes, e.g. by reaction of the corresponding acid $R^1COOH$ with a $C_{1-6}$-alkanol, 4-nitrophenol, 2,4-dinitrophenol, N-hydroxysuccinimide or 1-hydroxybenzotriazole.

The process according to the invention is advantageously carried out as a one-pot process, an ester first being reacted with hydroxylamine, a hydroxylamine derivative or a hydroxylammonium salt in the presence of a base at temperatures from −20 to 100° C. and the reaction product being alkylated in the presence of a phase-transfer catalyst at temperatures from 10 to 120° C. and pressures from 1 to 50 bar. The alkylated product is worked up according to known processes, for example extracted.

The base employed is preferably an alkali metal hydroxide or alkali metal carbonate. Sodium hydroxide is particularly preferred.

The reaction of the ester $R^1COOR^3$ with hydroxylamine, a hydroxylamine derivative or a hydroxylammonium salt is carried out in a suitable solvent. Suitable solvents are water, alcohols, such as, for example, methanol, ethanol, propanol and isopropanol, or ethers such as, for example, tetrahydrofuran or dioxane.

Mixtures of the solvents mentioned may also be employed. The preferred solvent is water.

Hydroxylamine is employed in an equimolar amount or in a small excess based on the ester.

The following examples illustrate the implementation of the process according to the invention, without a restriction being seen th rein.

EXAMPLES

Example 1
N-Methoxy-N-methyl-2-furancarboxamide

A solution of 4.22 g (0.11 mol) of NaOH in 15 ml of $H_2O$ was added in the course of 15 minutes with vigorous stirring to a solution of 418 g (0.025 mol) of hydroxylammonium sulfate and 5.66 g (0.045 mol) of methyl furan-2-carboxylate in 20 ml of $H_2O$ such that the temperature did not exceed 30° C. After stirring at 40° C. for 2 hours, the methanol formed in the reaction was completely removed by distillation. The residue was transferred to a pressure autoclave and 9.65 g (0.09 mol) of $Na_2CO_3$ followed by 2.99 g of tetrabutylammonium bromide were added. The autoclave was then closed and 22.7 g (0.45 mol) of methyl chloride were injected. After 15 hours at 40° C. (oil-bath temperature), the pressure in the autoclave was released. The pH was adjusted to 5 using 1 M HCl and the aqueous phase was extracted with ethyl acetate (4×100 ml). The organic phase was dried ($Na_2SO_4$) and the solvent was removed by distillation on a rotary evaporator. Purification of the residue by means of flash column chromatography (silica gel; hexane/ethyl acetate 3:1) yielded 4.16 g (60%) of the N-methoxy-N-methylamide as a yellow-orange oil.

| | |
|---|---|
| $^1H$ NMR (400 MHz, $CDCl_3$): | 7.60 (m, 1H), 7.15 (m, 1H), 6.53 (m, 1H), 3.75 (s, 3H), 3.34 (s, 3H). |
| $^{13}C$ NMR (400 MHz, $CDCl_3$): | 159.20 (C=O), 145.81 (C), 145.23 (CH), 117.36 (CH), 111.60 (CH), 61.38 ($OCH_3$), 33.20 ($NCH_3$). |

Example 2
N-Methoxy-N-methyl-methacrylamide

A solution of 4.0 g (0.10 mol) of NaOH in 15 ml of $H_2O$ was added in the course of 25 minutes to a solution of 4.19 g (0.026 mol) of hydroxylammonium sulfate and 4.51 g (0.045 mol) of methyl methacrylate in 20 ml of $H_2O$ cooled to 0° C. such that the temperature did not exceed 4° C. After 2 hours at 0° C., the reaction mixture was transferred to a pressure autoclave and 9.56 g (0.09 mol) of $Na_2CO_3$ followed by 2.99 g of tetrabutylammonium bromide were added. The autoclave was then closed and 23.7 g (0.47 mol) of methyl chloride were injected. After 15 hours at 40° C. (oil-bath temperature), the pressure in the autoclave was released. The pH was adjusted to 5 using 1 M HCl and the aqueous phase was extracted with ethyl acetate (4×100 ml). The organic phase was dried ($Na_2SO_4$) and the solvent was carefully removed by distillation on a rotary evaporator. Purification of the residue (5.03 g) by means of flash column chromatography (silica gel; hexane/ethyl acetate 4:1) yielded 2.96 g (51%) of the N-methoxy-N-methylamide as a slightly yellowish oil.

| | |
|---|---|
| $^1H$ NMR (400 MHz, $CDCl_3$): | 5.3 (s, 1H), 5.25 (s, 1H), 3.65 (s, 3H), 3.25 (s, 3H), 2.0 (s, 3H). |
| $^{13}C$ NMR (400 MHZ, $CDCl_3$): | 171.61 (C=O), 140.27 (C), 117.41 ($CH_2$), 61.24 ($OCH_3$), 33.37 ($NCH_3$), 19.90 ($CH_3$). |

Example 3
N-Methoxy-N-methyl-benzamide

A solution of 4.14 g (0.10 mol) of NaOH in 15 ml of $H_2O$ was added at 25° C. in the course of 30 minutes to a solution of 4.21 g (0.025 mol) of hydroxylammonium sulfate and 6.18 g (0.045 mol) of methyl benzoate in 20 ml of $H_2O$. The resulting mixture was transferred to an autoclave after stirring at 40° C. for 2 hours. 4.50 g (0.11 mol) of NaOH and 3.13 g of tetrabutylammonium bromide were added and 22.7 g (0.45 mol) of MeCl were then injected. After 3 hours at 100° C. (oil-bath temperature), the pressure in the autoclave was released. The mixture was adjusted to a pH of 5 using 1 M HCl and extracted with ethyl acetate (4×100 ml). The organic phase was dried ($Na_2SO_4$) and the solvent was removed by distillation on a rotary evaporator. Purification of the residue by means of Kugelrohr distillation yielded 3.42 g (46%) of the N-methoxy-N-methylamide as a colorless oil.

| | |
|---|---|
| $^1H$ NMR (400 MHz, $CDCl_3$): | 7.65–7.70 (m, 2H), 7.36–7.48 (m, 3H), 3.55 (s, 3H), 3.35 (s, 3H). |
| $^{13}C$ NMR (400 MHz, $CDCl_3$): | 169.99 (C=O), 134.22 (C), 130.55 (CH), 128.16 (CH), 128.01 (CH), 61.02 ($OCH_3$), 33.80 ($NCH_3$) |

Example 4
20 N-Methoxy-N-methyl-2-phenylacetamide

A solution of 4.16 g (0.104 mol) of NaOH in 15 ml of $H_2O$ was added dropwise at 25° C. in the course of 30 minutes to a solution of 4.11 g (0.025 mol) of hydroxylammonium sulfate and 6.78 g (0.045 mol) of methyl phenylacetate in 20 ml of $H_2O$. The slightly yellowish reaction mixture was stirred at 40° C. for 2 hours and then transferred to an autoclave. After addition of 3.87 g (0.097 mol) of NaOH and 3.13 g of tetrabutylammonium bromide, the autoclave was closed and 22.70 g (0.45 mol) of methyl chloride were injected. After 3 hours at 60° C. (oil-bath temperature), the pressure in the autoclave was released, the pH was adjusted to 14 using 1 M NaOH and the mixture was extracted with ethyl acetate (4×100 ml). The organic phase was dried ($Na_2SO_4$) and the solvent was removed by distillation on a rotary evaporator. Purification of the residue (6.28 g) by means of flash column chromatography (silica gel; hexane/ ethyl acetate 3:1) yielded 4.21 g (52%) of the N-methoxy-N-methyl-2-phenylacetamide as a slightly yellowish oil.

| $^1$H NMR (400 MHz, CDCl$_3$): | 7.20–7.36 (m, 5H), 3.76 (s, 2H), 3.58 (s, 3H), 3.18 (s, 3H). |
|---|---|
| $^{13}$C NMR (400 MHz, CDCl$_3$): | 172.43 (C=O), 135.04 (C), 129.33 (CH), 128.52 (CH), 126.79 (CH), 61.27 (OCH$_3$), 39.44 (CH$_2$), 32.29 (NCH$_3$). |

Example 5
N-Methoxy-N,3-dimethyl-2-butenamide

A solution of 4.29 g (0.11 mol) of NaOH in 15 ml of H$_2$O was added in the course of 20 minutes to a solution of 4.23 g (0.026 mol) of hydroxylammonium sulfate and 5.16 g (0.045 mol) of methyl 3,3-dimethylacrylate in 20 ml of H$_2$O cooled to 0° C. such that the temperature did not exceed 4° C. After 6 hours at 0° C., the reaction mixture was transferred to a pressure autoclave and 3.54 g (0.09 mol) of NaOH followed by 3.54 g of tetrabutylammonium bromide were added. The autoclave was then closed and 22.7 g (0.45 mol) of methyl chloride were injected. After 15 hours at 45° C. (oil-bath temperature), the pressure in the autoclave was released. The reaction mixture (the pH was 14) was extracted with diethyl ether (4×100 ml). The organic phase was dried (Na$_2$SO$_4$) and the solvent was carefully removed by distillation on a rotary evaporator. 2.58 g (40%) of the N-methoxy-N-methylamide were obtained as a slightly yellowish oil.

| $^1$H NMR (400 MHz, CDCl$_3$): | 6.13 (s, 1H), 3.67 (s, 3H), 3.20 (s, 3H), 2.14 (s, 3H), 1.90 (s, 3H). |
|---|---|
| $^{13}$C NMR (400 MHz, CDCl$_3$): | 168.16 (C=O), 153.03 (C), 114.44 (CH), 61.41 (OCH$_3$), 32.29 (NCH$_3$), 27.61 (CH$_3$), 20.19 (CH$_3$). |

What is claimed is:

1. A process for the preparation of a N-alko-N-alkylamide of the formula:

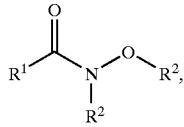

I in which:
$R^1$ is $C_{1-10}$-alkyl, cyclo-$C_{5-7}$-alkyl, cyclo-$C_{5-7}$-alkenyl, $C_{2-10}$-alkenyl, aryl, aryl-$C_{1-3}$-alkyl, heteroaryl, heteroaryl-$C_{1-3}$-alkyl or heterocyclyl; and $R^2$ is $C_{1-6}$alkyl;

comprising reacting an ester of the formula:

$$R^1COOR^3 \qquad II,$$

in which $R^1$ has the meaning indicated above and $R^3$ is $C_{1-6}$-alkyl, 4-nitophenyl, 2,4-dinitrophenyl, N-succinimido or benzotriazol-1-yl, with hydroxylamine, a hydroxylamine derivative or a hydroxylammonium salt, and alkylating the reaction product in the presence of a phase-transfer catalyst.

2. The process according to claim 1, wherein $R^2$ is methyl.

3. The process according to claim 2, wherein $R^1$ is $C_{2-10}$-alkenyl, aryl, aryl-$C_{1-3}$-alkyl or heteroaryl.

4. The process according to claim 3, wherein $R^1$ is phenyl, benzyl, furanyl, methallyl or 2-methyl-1-propenyl.

5. The process according to claim 4, wherein the phase-transfer catalyst is a quaternary ammonium salt, a phosphonium salt or a tertiary amine.

6. The process according to claim 5, wherein the phase-transfer catalyst is tetrabutylammonium bromide.

7. The process according to claim 6, wherein the alkylation is carried out by means of a compound of the formula:

$$R^2\text{-}X \qquad III,$$

is which $R^2$ is $C_{1-6}$-alkyl and X is a halogen atom.

8. The process according to claim 1, wherein hydroxylammonium sulfate is employed as the hydroxylammonium salt and the reaction product is alkylated with methyl chloride in the presence of tetrabutylammonium bromide.

9. The process according to claim 1, wherein $R^1$ is $C_{2-10}$-alkenyl, aryl, aryl-$C_{1-3}$-alkyl or heteroaryl.

10. The process according to claim 9, wherein $R^1$ is phenyl, benzyl, furanyl, methallyl or 2-methyl-1-propenyl.

11. The process according to claim 1, wherein the phase-transfer catalyst is a quaternary ammonium salt, a phosphonium salt or a tertiary amine.

12. The process according to claim 11, wherein the phase-transfer catalyst is tetrabutylammonium bromide.

13. The process according to claim 1, wherein the alkylation is carried out by means of a compound of the formula:

$$R^2\text{-}X \qquad III,$$

in which $R^2$ is $C_{1-6}$-alkyl and X is a halogen atom.

14. The process according to claim 13, wherein hydroxylammonium sulfate is employed as the hydroxylammonium salt and the reaction product is alkylated with methyl chloride in the presence of tetrabutylammonium bromide.

* * * * *